United States Patent
Yang et al.

(10) Patent No.: US 11,812,523 B2
(45) Date of Patent: Nov. 7, 2023

(54) THERMAL PROCESSING SYSTEM WITH TRANSMISSION SWITCH PLATE

(71) Applicants: Mattson Technology, Inc., Fremont, CA (US); Beijing E-Town Semiconductor Technology Co., Ltd., Beijing (CN)

(72) Inventors: Michael X. Yang, Palo Alto, CA (US); Rolf Bremensdorfer, Bibertal (DE)

(73) Assignees: BEIJING E-TOWN SEMICONDUCTOR TECHNOLOGY, CO., LTD, Beijing (CN); MATTSON TECHNOLOGY, INC., Fremont, CA (US)

( * ) Notice: Subject to any disclaimer, the term of this patent is extended or adjusted under 35 U.S.C. 154(b) by 375 days.

(21) Appl. No.: 16/898,495

(22) Filed: Jun. 11, 2020

(65) Prior Publication Data
US 2020/0396798 A1  Dec. 17, 2020

Related U.S. Application Data

(60) Provisional application No. 62/861,116, filed on Jun. 13, 2019.

(51) Int. Cl.
*H05B 3/00* (2006.01)
*H05B 1/02* (2006.01)
*G02F 1/163* (2006.01)

(52) U.S. Cl.
CPC ........... *H05B 3/0047* (2013.01); *G02F 1/163* (2013.01); *H05B 1/0233* (2013.01)

(58) Field of Classification Search
CPC .............. B23K 2101/40; B23K 26/034; B23K 26/066; G02F 1/15; G02F 1/157;
(Continued)

(56) References Cited

U.S. PATENT DOCUMENTS 5,708,755 A * 1/1998 Gronet .................... C30B 31/12
392/416
7,374,955 B2   5/2008 Izumome
(Continued)

FOREIGN PATENT DOCUMENTS

CN      107658219 A    2/2018
JP     2005032998 A    2/2005
(Continued)

OTHER PUBLICATIONS

International Search Report and Written Opinion for PCT/US2020/037148, dated Sep. 23, 2020, 14 pages.

*Primary Examiner* — Sang Y Paik
(74) *Attorney, Agent, or Firm* — Dority & Manning, P.A.

(57) ABSTRACT

Apparatus, systems, and methods for processing workpieces are provided. In one example, the system includes a processing chamber. The system includes a workpiece support configured to support a workpiece within the processing chamber. The system includes a heat source configured to emit light toward the workpiece. The system includes a shutter disposed between the workpiece and the heat source. The shutter includes an electrochromic material configurable in a translucent state and an opaque state. When the electrochromic material is configured in the opaque state, the shutter reduces transmission of the light through the shutter, and when the electrochromic material is configured in the translucent state, the light at least partially passes through the shutter. The system includes a controller configured to control the shutter to reduce transmission of light through the shutter during a thermal treatment process.

17 Claims, 7 Drawing Sheets

(58) Field of Classification Search
CPC .. G02F 1/163; H01L 21/268; H01L 21/67115; H01L 21/67248; H01L 22/26; H05B 2203/032; H05B 3/0047; H05B 1/0233
USPC ....... 219/444.1; 392/404, 407–408, 416–429
See application file for complete search history.

(56) References Cited

U.S. PATENT DOCUMENTS

| | | | |
|---|---|---|---|
| 7,873,265 | B2 | 1/2011 | Kitagawa et al. |
| 9,633,876 | B2 | 4/2017 | Timans et al. |
| 10,159,113 | B2 | 12/2018 | Möench et al. |
| 2004/0097063 | A1* | 5/2004 | Sakuma ............ H01L 21/67248 438/616 |
| 2005/0063453 | A1* | 3/2005 | Camm .............. H01L 21/67276 374/161 |
| 2005/0098553 | A1 | 5/2005 | Devine |
| 2006/0073622 | A1* | 4/2006 | Hartzell ............. B23K 26/0604 438/22 |
| 2016/0293424 | A1 | 10/2016 | Fuse et al. |
| 2017/0011975 | A1 | 1/2017 | Vukovic et al. |
| 2019/0198732 | A1* | 6/2019 | Shimizu ................. H01L 33/58 |

FOREIGN PATENT DOCUMENTS

| | | | |
|---|---|---|---|
| JP | 2007258244 A | 10/2007 | |
| JP | 2010225645 A | 10/2010 | |

\* cited by examiner

FIG. 7

THERMAL PROCESSING SYSTEM WITH TRANSMISSION SWITCH PLATE

PRIORITY CLAIM

The present application claims the benefit of priority of U.S. Provisional Application Ser. No. 62/861,116, titled "Thermal Processing System with Transmission Switch Plate," filed on Jun. 13, 2019, which is incorporated herein by reference.

FIELD

The present disclosure relates generally to thermal processing systems.

BACKGROUND

Thermal processing systems can define a processing chamber configured to accommodate a workpiece, such as a semiconductor wafer. Thermal processing systems can further include a heat source (e.g., heat lamp) configured to heat the workpiece. Some thermal process systems can be used to implement a spike anneal process on a workpiece.

SUMMARY

Aspects and advantages of embodiments of the present disclosure will be set forth in part in the following description, or may be learned from the description, or may be learned through practice of the embodiments.

One example aspect of the present disclosure is directed to a thermal processing system. The system includes a processing chamber. The system includes a workpiece support configured to support a workpiece within the processing chamber. The system includes a heat source configured to emit light toward the workpiece. The system includes a shutter disposed between the workpiece and the heat source. The shutter includes an electrochromic material configurable in a translucent state and an opaque state. When the electrochromic material is configured in the opaque state, the shutter reduces transmission of the light through the shutter, and when the electrochromic material is configured in the translucent state, the light at least partially passes through the shutter. The system includes a controller configured to control the shutter to reduce transmission of light through the shutter during a thermal treatment process.

Other example aspects of the present disclosure are directed to systems, methods, devices, and processes for thermally treating a semiconductor substrate.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to thermal processing systems and associated methods to more tightly control a temperature profile during a thermal treatment process, such as a spike anneal process. A spike anneal process can be a thermal process which heats workpieces to high temperatures on a timescale of several seconds or less. Spike anneal processes can be used, for instance, to activate dopants in a workpiece such as a silicon wafer.

At high temperatures, dopant atoms can diffuse into the workpiece at high rates, with most of the diffusion occurring at peak annealing temperatures required to activate dopants. With increasing performance demands and decreasing device sizes in semiconductor device manufacturing, it can be desirable to tightly control a spike anneal heating profile as precisely as possible in a way which subjects the workpiece to temperature conditions which serve to activate the dopants while, at the same time, limiting diffusion of the dopants.

According to aspects of the present disclosure, a shutter including electrically controllable optical properties (e.g., transmissivity, reflectivity, etc.) can be disposed between a workpiece (e.g., a semiconductor material or a wafer) and one or more heat sources (e.g., lamp heat source(s), laser(s), or any other suitable light source) configured to emit light towards the workpiece. In some embodiments, the shutter can include an electrochromic material configurable in a translucent state and an opaque state. When the electrochromic material is configured in the opaque state, the shutter can reduce transmission of the light through the shutter. An example opaque state can be a reflective state where a majority of the light from the heat source is reflected off of a surface of the shutter. When the electrochromic material is configured in the translucent state, the light can at least partially pass through the shutter.

In some embodiments, the electrochromic material can include a liquid crystal reflective mirror where liquid crystals are aligned to be either reflective (e.g., partially reflective, or fully reflective) or transmissive (e.g., partially transparent or fully transparent) depending on an electrical signal provided to the shutter. When the shutter is in the opaque state, the liquid crystal reflective mirror can be aligned to be reflective. When the shutter is in the translucent state, the liquid crystal reflective mirror can be aligned to be transmissive. In some embodiments, the electrochromic material can include metal oxides (e.g., tungsten oxide $WO_3$), or any other suitable material such that the shutter can be controlled in the opaque state and the translucent state.

In some embodiments, the controllable shutter can be used in a thermal processing system to reduce a peak width associated with a thermal treatment process (e.g., a spike anneal process). The peak width can describe a time interval when a workpiece can be at or above a reference temperature that can be obtained from subtracting a temperature value (e.g., 50K, etc.) from a peak temperature ($T_{peak}$) of a temperature time profile (e.g., a spike anneal heating p rofile). For instance, a 50° temperature (50K) peak width is defined as a time interval where a temperature of a surface of the workpiece is above ($T_{peak}$–50K). The reduced peak width obtained using thermal processing according to example aspects of the present disclosure can allow the thermal processing to achieve effective annealing cycles at relatively high temperatures while still reducing undesirable processes, such as excessive dopant diffusion.

In some embodiments, the thermal processing system can include a controller to control an operational state (e.g., a translucent state or an opaque state) of the shutter during the thermal process to reduce a peak width associated with the thermal treatment process. For instance, the controller can control the operational state of the shutter such that the thermal treatment process has a 50k temperature peak width of about 0.8 second or less.

In some embodiments, the controller (e.g., a computer, microcontroller(s), other control device(s), etc.) can include one or more processors and one or more memory devices. The one or more memory devices can store computer-readable instructions that when executed by the one or more processors cause the one or more processors to perform operations, such as control an operational state of the shutter during the thermal process, or other suitable operation as described below.

According to example aspects of the present disclosure, the controller can control an operational state of the shutter based at least in part on a heat source activation signal to reduce transmission of light through the shutter during the thermal treatment process. The heat source activation signal can specify activation of one or more heat sources to emit light during the thermal treatment process. For instance, the controller can generate a heat source activation signal to turn on heat source(s) to emit light to heat the workpiece, and then the controller can control an operational sate of the shutter to be in a translucent state or be in an opaque state at a time determined based on the time of activation of the heat source.

For example, in some embodiments, the controller can be configured to change the operational state of the shutter from the translucent state to the opaque state after expiration of a time interval from activation of the heat source(s) during the thermal treatment process. For instance, subsequent to a first time period (e.g., where the workpiece is maintained at a baseline temperature), the controller can generate a heat source activation signal to activate the heat source(s) to emit light to heat the workpiece. After activating the heat source(s), the controller can determine expiration of a time interval, such as a time interval in a range of about 5 milliseconds to about 100 milliseconds. Upon the expiration of the time interval, the controller can control the shutter to change the operational state of the shutter from the translucent state to the opaque state to reduce transmission of light from the heat source(s) through the shutter. As such, the peak width during the spike anneal process can be reduced to allow the thermal treatment process to achieve effective annealing cycles at relatively high temperatures while still reducing undesirable dopant diffusion.

According to example aspects of the present disclosure, the controller can control an operational state of the shutter based at least in part on a temperature setpoint to reduce transmission of light through the shutter during the thermal treatment process. The temperature setpoint can describe a temperature point of a temperature time profile (e.g., a heating profile) associated with the thermal treatment process. For instance, the temperature setpoint can be within about 20% of a peak temperature of a heating profile associated with the thermal treatment process (e.g., a spike anneal heating profile).

In some embodiments, the controller can change the operational state of the shutter from the translucent state to the opaque state based at least in part on a temperature of the workpiece reaching the temperature setpoint. For instance, during a thermal treatment process (e.g., a spike anneal process), the controller can obtain data indicative of a temperature of the workpiece (e.g., based on signals from a pyrometer). The controller can access data indicative of a temperature setpoint. The controller can control the heat source(s) to emit light to heat the workpiece to increase the temperature of the workpiece (e.g., as part of a spike anneal process). When a temperature of the workpiece is below the temperature setpoint, the controller can control an operational state of the shutter to be in a translucent state. When the temperature of the workpiece is increased to reach the temperature setpoint, the controller can control the shutter to change the operational state of the shutter from the translucent state to the opaque state to reduce transmission of light from the heat source(s) through the shutter.

In some embodiments, the controller can control the operational state of the shutter to be in the opaque state for a time period starting from a time point corresponding to the temperature setpoint that the temperature of the workpiece is increased to reach. The time period can be predetermined, such as in a range of about 5 milliseconds to about 100 milliseconds. Alternatively and/or additionally, the time period can end at a time point corresponding to the temperature of the workpiece returning to the temperature setpoint.

In some embodiments, the thermal processing system can include one or more pyrometers to obtain data indicative of a temperature of the workpiece. In some embodiments, operation of the shutter can be synchronized with a temperature measurement. For instance, the controller can control the shutter to be in the opaque state to block light during a temperature measurement period to reduce background radiation of the heat source(s). Pyrometer(s) can obtain data indicative of the temperature of the workpiece during the temperature measurement period.

One example aspect of the present disclosure is directed to a method for controlling operation of a thermal processing system. The method can include activating a heat source(s) to emit light to heat a workpiece for a spike anneal process. The method can include determining expiration of a time interval subsequent to activating the heat source(s) during the spike anneal process. The method can include upon the expiration of the time interval, controlling a shutter to change an operational state of the shutter from a translucent state to an opaque state to reduce transmission of light from the heat source(s) through the shutter during the spike anneal process.

Another example aspect of the present disclosure is directed to a method for controlling operation of a thermal processing system. The method can include obtaining data indicative of a temperature of a workpiece during a spike anneal heating process. The method can include accessing data indicative of a temperature setpoint. The method can include controlling a shutter to change an operational state of the shutter from a translucent state to an opaque state based at least in part on a temperature of the workpiece reaching the temperature setpoint during the spike anneal heating process.

Aspects of the present disclosure are discussed with reference to a "workpiece" "wafer" or semiconductor wafer for purposes of illustration and discussion. Those of ordinary skill in the art, using the disclosures provided herein, will understand that the example aspects of the present disclosure can be used in association with any semiconductor substrate or other suitable substrate. In addition, the use of the term "about" in conjunction with a numerical value is intended to refer to within ten percent (10%) of the stated numerical value.

Figure 1:
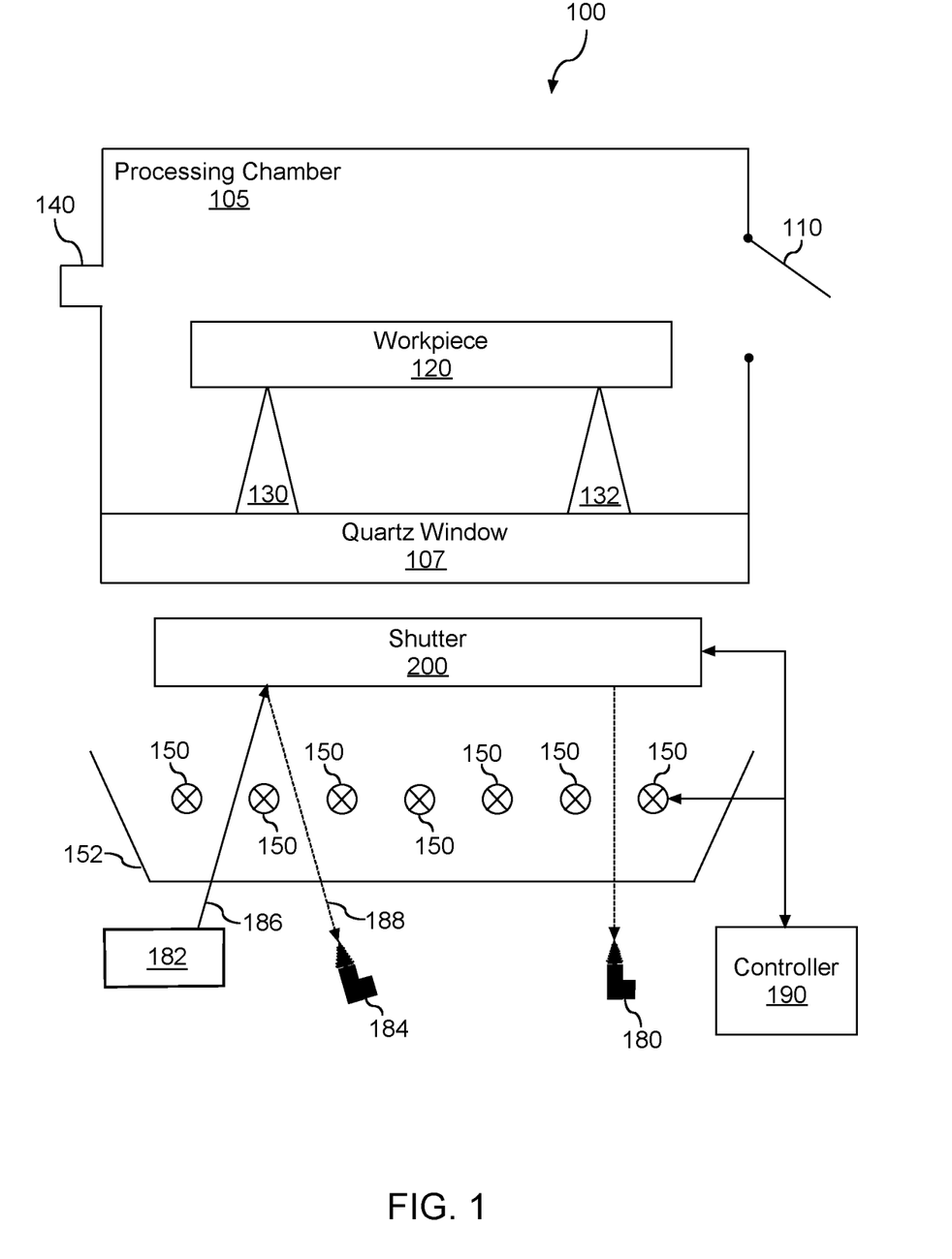
FIG. 1 depicts a thermal processing system according to example embodiments of the present disclosure.

Referring now to the figures, FIG. 1 depicts a thermal processing system 100 according to example embodiments of the present disclosure. As shown, the thermal processing system 100 can include a processing chamber 105. In some implementations, the processing chamber 105 can be defined, at least in part, by a quartz window 107 of the thermal processing system 100. In some implementations, the quartz window 107 can be doped with hydroxide OH. It should be appreciated that the one or more surfaces defining the processing chamber 105 can be formed from any suitable material. For instance, in some implementations, the one or more surfaces defining the processing chamber 105 can be formed from quartz.

As shown, the thermal processing system 100 can include a door 110 movable between an open position (FIG. 1) and a closed position (not shown) to permit selective access to the processing chamber 105. For instance, the door 110 can be moved to the open position to allow a workpiece 120 to be positioned within the processing chamber 105. In some implementations, the workpiece 120 can be supported, at least in part, by support pins 130, 132 of the quartz window 107. In this manner, heat associated with emitting light onto the quartz window 170 can be transferred to the workpiece 120 via the support pins 130, 132. Furthermore, the door 110 can be moved to the closed position once the workpiece 120 is disposed on the support pins 130, 132 of the quartz window 107. In some implementations, the processing chamber 105 can be sealed off from an external environment when the door 110 is in the closed position.

In some implementations, the one or more surfaces defining the processing chamber 105 can define a gas inlet port 140. In this manner, a process gas provided from a gas source can flow into the processing chamber 105 via the gas inlet port 140. In some implementations, the process gas can include an inert gas that does not react with the workpiece 120. Alternatively, the process gas can include a reactive gas that reacts with workpiece 120 to deposit a layer of material on the surface of the workpiece 120. For instance, in some implementations, the process gas can include ammonium NH$_3$ gas. It should be appreciated, however, that the process gas can include any suitable reactive gas. For instance, in alternative implementations, the reactive gas can include H$_2$ gas.

The thermal processing system 100 can include one or more heat sources 150 disposed outside of the processing chamber 105. The one or more heat sources 150 can be configured to emit light towards the workpiece 120 during a thermal treatment process, such as a rapid thermal treatment, or a spike anneal process. The light emitted from the one or more heat sources 150 can raise a temperature of the workpiece 120. In some implementations, the one or more heat sources 150 can increase the temperature of the workpiece 120 by greater than about 500° C. within a predetermined amount of time (e.g., less than 2 seconds).

It should be appreciated that the one or more heat sources 150 can include any suitable type of heat source configured to emit light. For instance, in some implementations, the one or more heat sources 150 can include one or more heat lamps (e.g., linear lamps). In alternative implementations, the one or more heat sources 150 can include one or more lasers configured to emit a laser beam onto the workpiece 120.

In some implementations, the thermal processing system 100 can include a reflector 152 positioned such that the light emitted from the one or more heat sources 150 is directed to or towards the processing chamber 105. More specifically, the reflector 152 can direct the light emitted from the one or more heat sources 150 to or towards the quartz window 107 such that the light can pass through the quartz window 107 and into the processing chamber 105. It should be appreciated that at least a portion of the light entering the processing chamber 105 via the quartz window 107 can be emitted onto the workpiece 120. In this manner, the light emitted from the one or more heat sources 150 can, as discussed above, raise the temperature of the workpiece 120 during a thermal treatment process, such as a rapid thermal treatment process (e.g., spike anneal treatment). As will be discussed below in more detail, the thermal processing system 100 can include one or more pyrometer(s) configured to obtain data indicative of a temperature profile associated with the workpiece 120.

In some implementations, the thermal processing system 100 can include a device configured to determine reflectivity of the workpiece 120. As shown, the device can include a transmitter 182 and a receiver 184. The transmitter 182 can be configured to emit a signal 186 that reflects off the workpiece 120. The reflected signal 188 can be received via the receiver 184 of the device. It should be appreciated that a controller 190 of the thermal processing system 100 can be configured to determine reflectivity of the based, at least in part, on a difference between one or more parameters (e.g., phase, amplitude) of the signal 186 and the reflected signal 188.

According to example aspects of the present disclosure, as shown, a shutter 200 can be disposed between the workpiece 120 and the one or more heat sources 150. More specifically, the shutter 200 can be disposed between the quartz window 107 and the one or more heat sources 150. In this manner, the shutter 200 can be positioned outside of the processing chamber 105. However, in other implementations, the shutter 200 can be positioned inside the processing chamber 105.

The shutter 200 can include an electrochromic material configurable in a translucent state and an opaque state. When the electrochromic material is configured in the opaque state, the shutter can reduce transmission of the light at wavelengths associated with light emitted from the heat source(s) 150 through the shutter, and when the electrochromic material is configured in the translucent state, the light at wavelengths associated with light emitted from the heat source(s) 150 can at least partially pass through the shutter. In some embodiments, the electrochromic material can include a liquid crystal reflective mirror where liquid crystals are aligned to be either reflective (e.g., partially reflective, or fully reflective) or transmissive (e.g., partially transparent, or fully transparent) depending on an electrical signal provided to the shutter 200. When the shutter 200 is in the opaque state, the liquid crystal reflective mirror can be aligned to be reflective. When the shutter is in the translucent state, the liquid crystal reflective mirror can be aligned to be transmissive. In some embodiments, the electrochromic material can include metal oxides (e.g., tungsten oxide $WO_3$) or any other suitable material such that the shutter can be controlled between an opaque state and a translucent state.

According to example aspects of the present disclosure, the controller 190 can control an operational state (e.g., a translucent state or an opaque state) of the shutter 200 during a thermal process to reduce a peak width associated with a thermal treatment process. For instance, the controller 190 can control the operational state of the shutter 200 such that the thermal treatment process has a 50k temperature peak width of about 0.8 second or less.

In some embodiments, the controller 190 (e.g., a computer, microcontroller(s), other control device(s), etc.) can include one or more processors and one or more memory devices. The one or more memory devices can store computer-readable instructions that when executed by the one or more processors cause the one or more processors to perform operations, such as turning on or turning off the heat source(s) 150, controlling an operational state of the shutter 200 during the thermal process, or other suitable operation as described below.

According to example aspects of the present disclosure, the controller 190 can control an operational state of the shutter 200 based at least in part on a heat source activation signal to reduce transmission of light through the shutter 200 during the thermal treatment process. The heat source activation signal can specify activation of one or more heat sources 150 to emit light during the thermal treatment process. For instance, the controller 190 can generate a heat source activation signal to turn on heat source(s) 150 to emit light to heat the workpiece, and then the controller 190 can control an operational sate of the shutter 200 to be in a translucent state or be in an opaque state.

In some embodiments, the controller 190 can change the operational state of the shutter 200 from the translucent state to the opaque state after expiration of a time interval from activation of the heat source(s) 150 during the thermal treatment process. For instance, the controller 190 can generate a heat source activation signal to activate the heat source(s) 150 to emit light to heat the workpiece 120. Subsequent to activating the heat source(s), the controller can determine expiration of a time interval, such as the time interval is in a range of about 5 milliseconds to about 100 milliseconds. Upon the expiration of the time interval, the controller 190 can control the shutter 200 to change the operational state of the shutter 200 from a translucent state to an opaque state to reduce transmission of light from the heat source(s) 150 through the shutter 200.

According to example aspects of the present disclosure, the controller 190 can control an operational state of the shutter 200 based at least in part on a temperature setpoint to reduce transmission of light through the shutter 200 during the thermal treatment process. For instance, the temperature setpoint can be within about 20% of a peak temperature of a heating profile associated with the thermal treatment process (e.g., a spike anneal heating profile).

In some embodiments, the controller 190 can change the operational state of the shutter 200 from the translucent state to the opaque state based at least in part on a temperature of the workpiece 120 reaching the temperature setpoint. For instance, during a thermal treatment process (e.g., a spike anneal process), the controller 190 can obtain data indicative of a temperature of the workpiece 120. The controller 190 can access data indicative of a temperature setpoint. When a temperature of the workpiece 120 is below the temperature setpoint, the controller 190 can control an operational state of the shutter 200 to be in a translucent state. When the temperature of the workpiece 120 is increased to reach the temperature setpoint, the controller 190 can control the shutter 200 to change the operational state of the shutter 200 from the translucent state to the opaque state to reduce transmission of light from the heat source(s) 150 through the shutter 200.

In some embodiments, the controller 190 can control the operational state of the shutter 200 to be in the opaque state for a time period starting from a time point corresponding to the temperature setpoint that the temperature of the workpiece 120 is increased to reach. The time period can be predetermined, such as in a range of about 5 milliseconds to about 100 milliseconds. Alternatively and/or additionally, the time period can end at a time point corresponding to the temperature setpoint that the temperature of the workpiece 120 is decreased to reach.

In some embodiments, operation of the shutter 200 can be synchronized with a temperature measurement. For instance, the controller 190 can control the shutter 200 to be in the opaque state to block light during a temperature measurement period to reduce background radiation of the heat source(s) 150. Pyrometer(s) 180 can obtain data indicative of the temperature of the workpiece 120 during the temperature measurement period.

Figure 2:
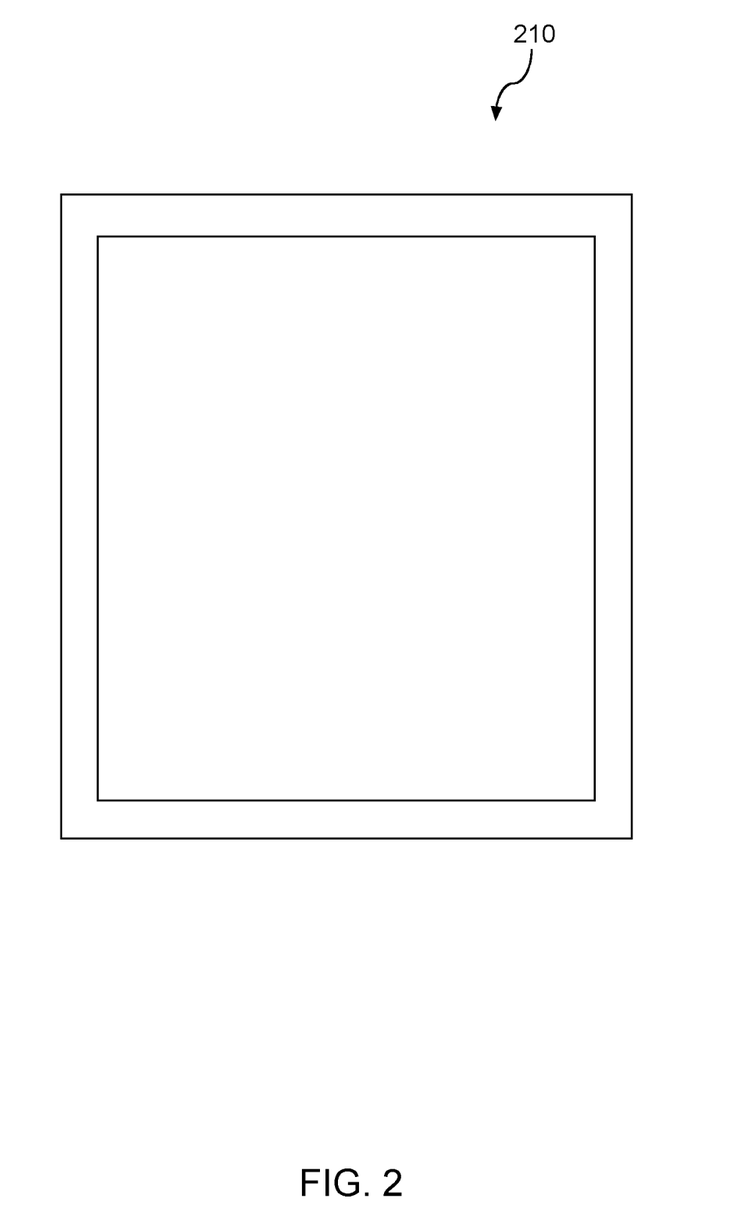
FIG. 2 depicts a plan view of a shutter of a thermal processing system according to example embodiments of the present disclosure.

FIG. 2 depicts a top view 210 of a shutter 200 of a thermal processing system 100 according to example embodiments of the present disclosure. As can be seen in FIG. 2, the top view 210 of the shutter 200 shows that the shutter 200 has 1×1 pixel. The shutter 200 can have a size that is about a size of distribution of the heat source(s) 150.

Figure 3:
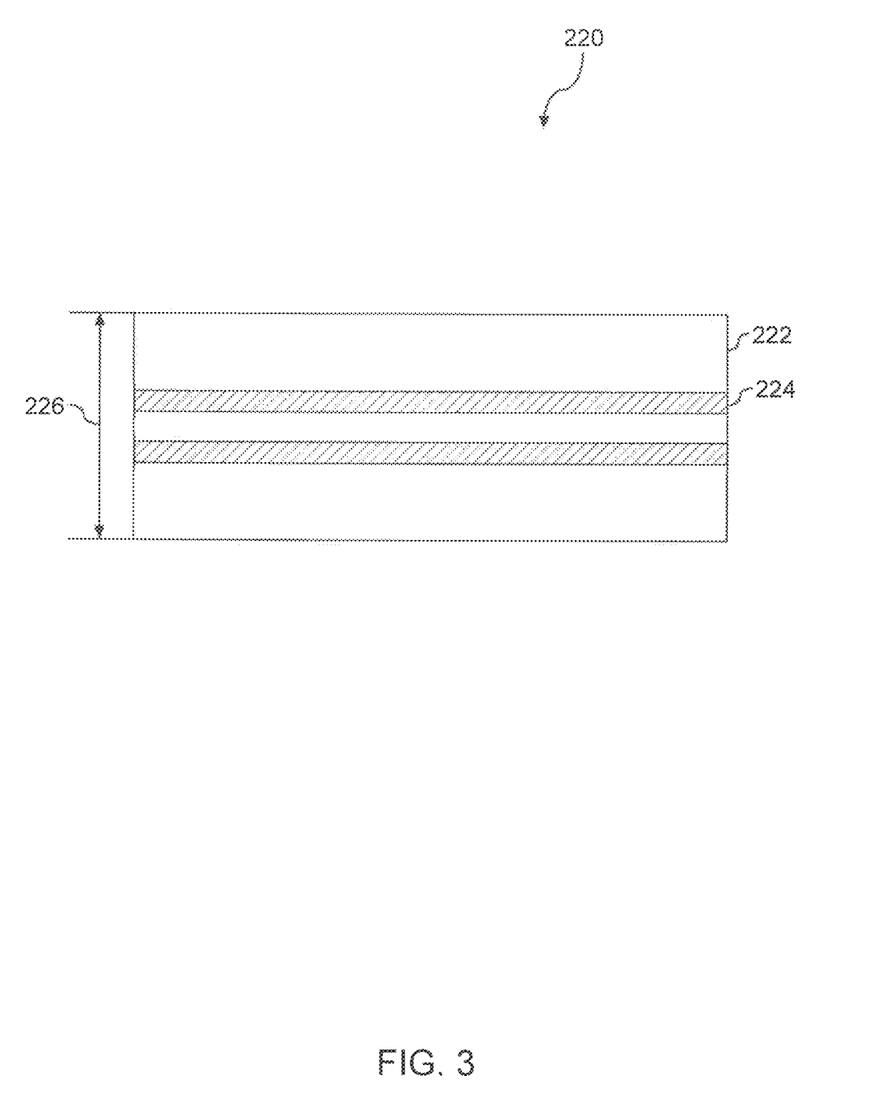
FIG. 3 depicts a cross-sectional view of a shutter of a thermal processing system according to example embodiments of the present disclosure.

FIG. 3 depicts a side view 220 of a shutter 200 of a thermal processing system 100 according to example embodiments of the present disclosure. As can be seen in FIG. 3, the shutter 200 can have a plurality of layers. The shutter 200 can include multiple high temperature glass plates 222 and multiple spacers 224 between the glass plates 222. A thickness 226 of the shutter 200 can be about 3 millimeters or less (e.g., 2.84 millimeters). A thickness of the glass plate 222 can be in a range of about 1 millimeter to about 2 millimeter. The glass plates can be an electrochromic material.

Figure 4:
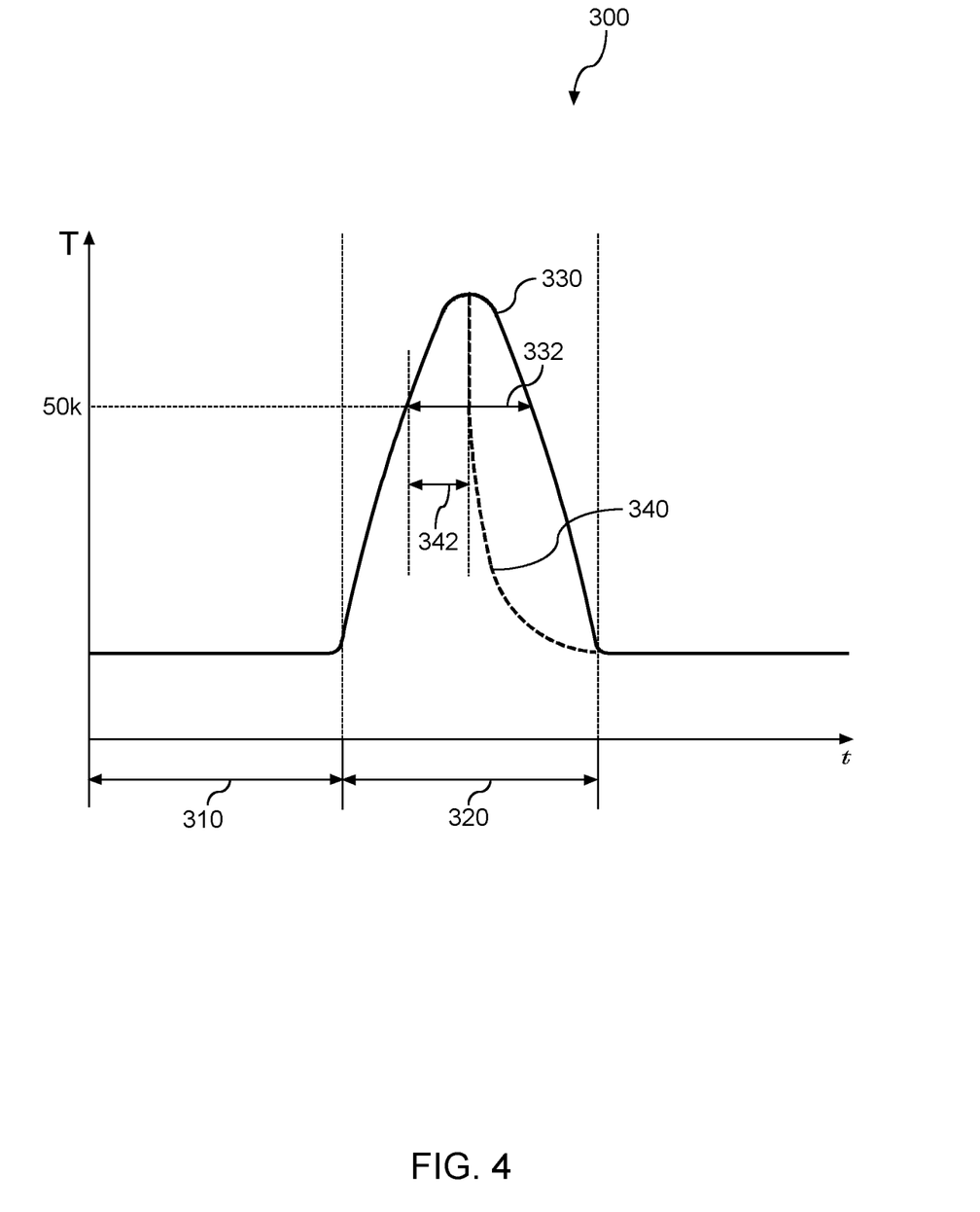
FIG. 4 depicts an example temperature time profile of a thermal processing system according to example embodiments of the present disclosure.

FIG. 4 depicts an example temperature time profile 300 of a thermal processing system 100 according to example embodiments of the present disclosure. As can be seen in FIG. 4, subsequent to a first time period 310, a spike anneal process 320 occurs. A heating profile 330 (solid-line curve) can be generated by a conventional spike anneal. In the conventional spike anneal, one or more heat sources can emit light to heat a workpiece without a shutter. A heating profile 340 (dash-line curve) can be generated by the thermal processing system 100 that can reduce light transmission with the shutter 200. The conventional spike anneal can have a 50° temperature (e.g., 50K) peak width 332 of the heating profile 330 that is greater than a 50K peak width 342 of the heating profile 340 of the thermal processing system 100.

Figure 5:
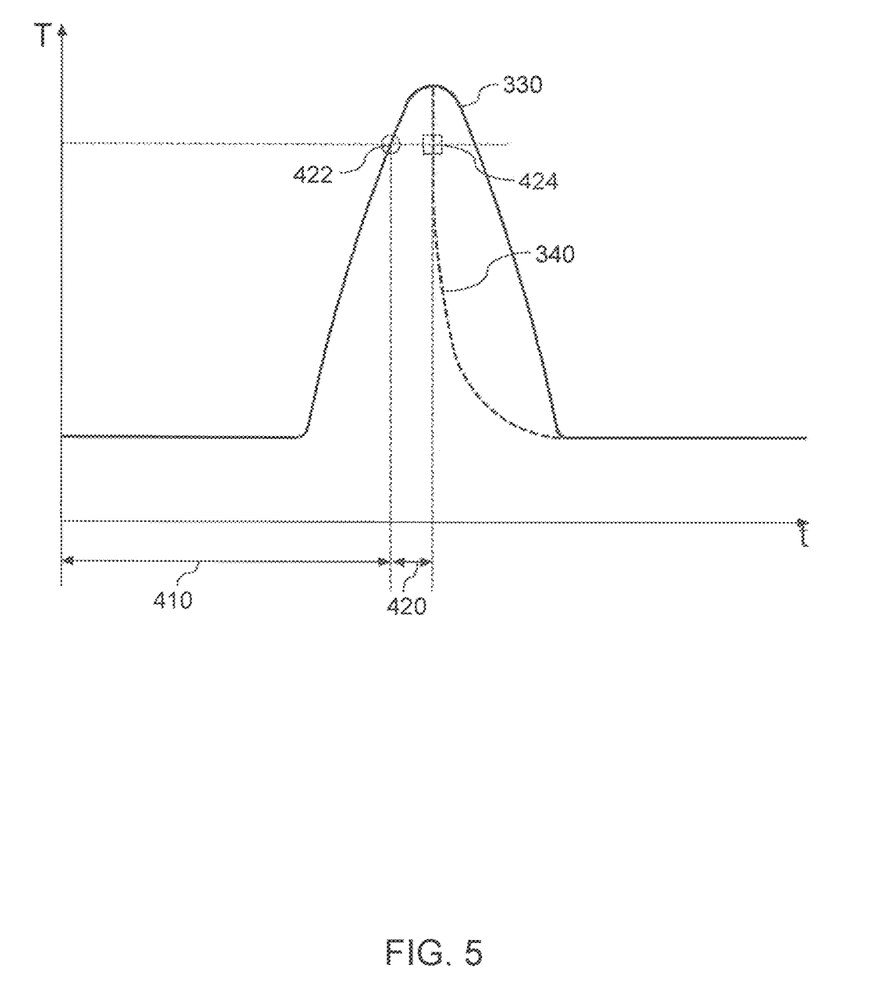
FIG. 5 depicts an example temperature time profile of a thermal processing system according to example embodiments of the present disclosure.

FIG. 5 depicts an example temperature time profile 400 of a thermal processing system 100 according to example embodiments of the present disclosure. As can be seen in FIG. 5, a first temperature setpoint 422 that a temperature of the workpiece 120 is increased to reach is within about 20% of a peak temperature of the heating profile 340 of the thermal processing system 100. A second temperature setpoint 424 that a temperature of the workpiece 120 is decreased to reach is also within about 20% of the peak temperature of the heating profile 340. When the temperature of the workpiece 120 is below the first temperature setpoint 422, such as during a first time period 410, the shutter 200 can be controlled to be in a translucent state. When the temperature of the workpiece 120 is increased to reach the first temperature setpoint 422, the shutter 200 can be changed from the translucent state to an opaque state for a time period 420 starting from a time point corresponding to the first temperature setpoint 422 to a time point corresponding to the second temperature setpoint 424. As can be seen, control of the shutter in this manner can reduce a 50k peak width associated with the spike anneal process.

Figure 6:
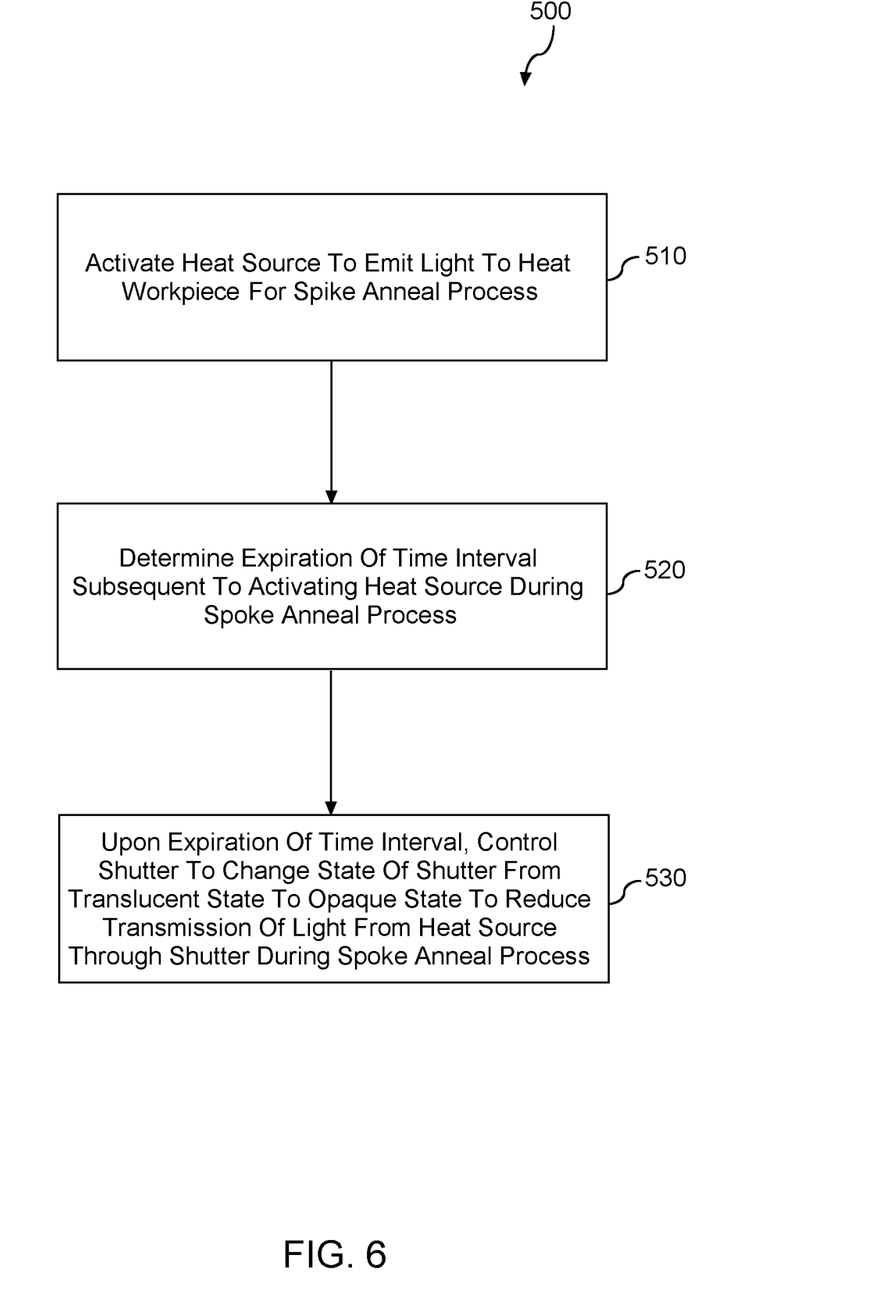
FIG. 6 depicts a flow diagram of an example method according to example embodiments of the present disclosure.

FIG. 6 depicts a flow diagram of an example method (600) according to example embodiments of the present disclosure. The method (600) will be discussed with reference to the thermal processing system 100 of FIG. 1 by way of example. The method (600) can be implemented in any suitable plasma processing apparatus. FIG. 6 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (610), the method can include activating a heat source to emit light to heat a workpiece for a spike anneal process. For instance, a thermal processing system 100 can include a controller 190 to generate a heat source activation signal to activate the heat source(s) 150 to emit light to heat the workpiece 120.

At (620), the method can include determining expiration of a time interval subsequent to activating the heat source during the spike anneal process. For instance, the controller 190 of the thermal processing system 100 can determine expiration of a time interval, such as the time interval is in a range of about 5 milliseconds to about 100 milliseconds.

At (630), the method can include upon expiration of the time interval, controlling a shutter to change an operational state of the shutter from a translucent state to an opaque state to reduce transmission of light from the heat source through the shutter during the spike anneal process. For instance, the controller 190 of the thermal processing system 100 can change an operational state of the shutter 200 from a translucent state to an opaque state to reduce transmission of light from the heat source 150.

Figure 7:
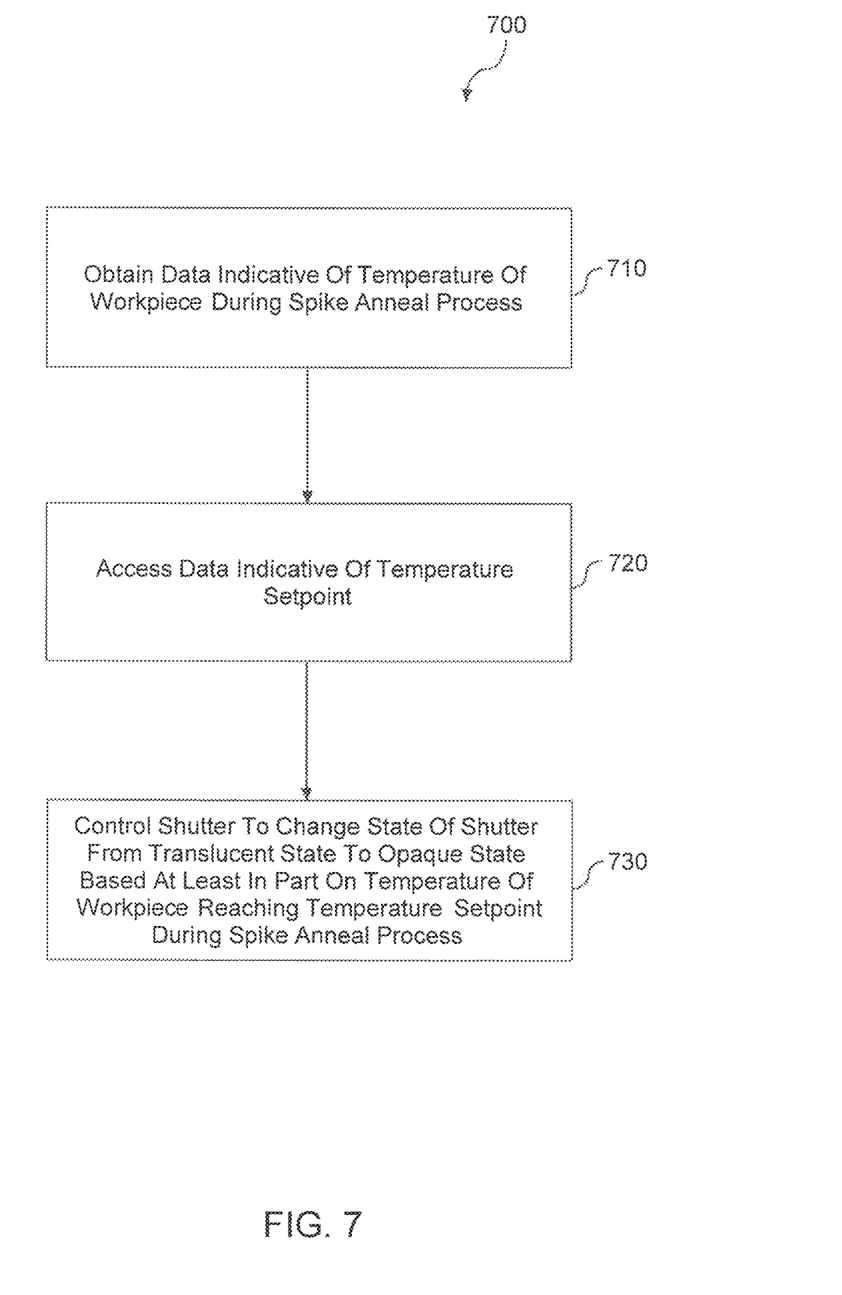
FIG. 7 depicts a flow diagram of an example method according to example embodiments of the present disclosure.

FIG. 7 depicts a flow diagram of an example method (700) according to example embodiments of the present disclosure. The method (700) will be discussed with reference to the thermal processing system 100 of FIG. 1 by way of example. The method (700) can be implemented in any suitable plasma processing apparatus. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (710), the method can include obtaining data indicative of a temperature of a workpiece during a spike anneal process. For instance, a thermal processing system 100 can include one or more pyrometers 180 to obtain data indicative of a temperature of a workpiece 120.

At (720), the method can include accessing data indicative of a temperature setpoint. For instance, a controller 190 of the thermal processing system 100 can access data indicative of a temperature setpoint. The temperature setpoint can be within about 20% of a peak temperature of a heating profile associated with the spike anneal heating profile.

At (730), the method can include controlling the shutter to change an operational state of the shutter from a translucent state to an opaque state based at least in part on the temperature of the workpiece reaching the temperature setpoint during the spike anneal heating process. For instance, when a temperature of the workpiece 120 is below the temperature setpoint, the controller 190 can control an operational state of the shutter 200 to be in a translucent state. When the temperature of the workpiece is increased to reach the temperature setpoint, the controller 190 can control the shutter 200 to change the operational state of the shutter 200 from the translucent state to the opaque state to reduce transmission of light from the heat source(s) 150 through the shutter 200.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A thermal processing system, comprising:
a processing chamber;
a workpiece support configured to support a workpiece within the processing chamber;
a heat source configured to emit light towards the workpiece;
a shutter disposed between the workpiece and the heat source, the shutter comprising an electrochromic material configurable in a translucent state and an opaque state, wherein when the electrochromic material is configured in the opaque state, the shutter reduces transmission of light through the shutter, and when the electrochromic material is configured in the translucent state, light at least partially passes through the shutter; and
a controller configured to control the shutter to reduce transmission of light through the shutter during a thermal treatment process;
wherein the thermal treatment process is a spike anneal process, the spike anneal process increasing a temperature of the workpiece by greater than about 500° C. or greater in less than about 2 seconds. the spike anneal process associated with an increase in temperature to a peak temperature and a decrease in temperature from the peak temperature; and wherein the controller is configured to control an operational state of the shutter during the spike anneal process to reduce a peak width associated with the spike anneal process, the spike anneal process has a 50k temperature peak width of about 0.8 second or less.

2. The thermal processing system of claim 1, wherein when the shutter is in the opaque state, the shutter is configured to be reflective.

3. The thermal processing system of claim 1, wherein the controller is configured to control an operational state of the shutter based at least in part on a heat source activation signal to reduce the transmission of the light through the shutter during the thermal treatment process.

4. The thermal processing system of claim 3, wherein the heat source activation signal specifies activation of the heat source to emit the light during the thermal treatment process.

5. The thermal processing system of claim 3, wherein the controller is configured to change the operational state of the shutter from the translucent state to the opaque state after expiration of a time interval from activation of the heat source during the thermal treatment process.

6. The thermal processing system of claim 5, wherein the time interval is in a range of about 5 milliseconds to about 100 milliseconds.

7. The thermal processing system of claim 1, wherein the controller is configured to control an operational state of the shutter based at least in part on a temperature setpoint to reduce the transmission of the light through the shutter during the thermal treatment process.

8. The thermal processing system of claim 7, wherein the controller is configured to change the operational state of the shutter from the translucent state to the opaque state based at least in part on a temperature of the workpiece reaching the temperature setpoint.

9. The thermal processing system of claim 8, wherein data indicative of the temperature of the workpiece is obtained via one or more pyrometers.

10. The thermal processing system of claim 7, wherein the temperature setpoint is within about 20% of a peak temperature of a heating profile associated with the thermal treatment process.

11. The thermal processing system of claim 1, wherein the heat source is a lamp heat source.

12. A method for controlling operation of a thermal processing system comprising a heat source and a shutter positioned between the heat source and a workpiece disposed within a processing chamber of the thermal processing system, the method comprising:

activating the heat source to emit light to heat the workpiece for a spike anneal process, the spike anneal process increasing a temperature of the workpiece by greater than about 500° C. or greater in less than about 2 seconds, the spike anneal process associated with an increase in temperature to a peak temperature and a decrease in temperature from the peak temperature;

determining expiration of a time interval subsequent to activating the heat source during the spike anneal process; and upon the expiration of the time interval, controlling the shutter to change an operational state of the shutter from a translucent state to an opaque state to reduce transmission of light from the heat source through the shutter during the spike anneal process;

wherein the shutter comprises an electrochromic material configurable in the translucent state or the opaque state, wherein when the electrochromic material is configured in the opaque state, the shutter reduces transmission of light through the shutter, and when the electrochromic material is configured in the translucent state, light at least partially passes through the shutter; and wherein controlling the shutter to change the operational state of the shutter comprises controlling the shutter to change the operational state of the shutter to reduce a peak width associated with the spike anneal process the spike anneal process has a 50k temperature peak width of about 0.8 second or less.

13. The method of claim 12, wherein controlling the shutter to change the operational state of the shutter to reduce a peak width associated with the spike anneal process includes the spike anneal process having a 50k temperature peak width of about 0.8 second or less.

14. The method of claim 12; wherein when the shutter is in the opaque state, the shutter is configured to be reflective.

15. The method of claim 12, wherein the time interval is in a range of about 5 milliseconds to about 100 milliseconds.

16. A method for controlling operation of a thermal processing system comprising a heat source and a shutter positioned between the heat source and a workpiece disposed within a processing chamber of the thermal processing system, the method comprising:

obtaining data indicative of a temperature of the workpiece during a spike anneal process, the spike anneal process increasing a temperature of the workpiece by greater than about 500° C. or greater in less than about 2 seconds, the spike anneal process associated with an increase in temperature to a peak temperature and a decrease in temperature from the peak temperature;

accessing data indicative of a temperature setpoint; and controlling the shutter to change an operational state of the shutter from a translucent state to an opaque state based at least in part on the temperature of the workpiece reaching the temperature setpoint during the spike anneal process;

wherein the shutter comprises an electrochromic material configurable in the translucent state or the opaque state, wherein when the electrochromic material is configured in the opaque state, the shutter reduces transmission of light emitted from the heat source through the shutter, and when the electrochromic material is configured in the translucent state, light at least partially passes through the shutter; and wherein controlling the shutter to change the operational state of the shutter comprises controlling the shutter to change the operational state of the shutter to reduce a peak width associated with the spike anneal process, the spike anneal process has a 50k temperature peak width of about 0.8 second or less.

17. The method of claim 16, wherein the temperature setpoint is within about 20% of a peak temperature of a heating profile associated with the spike anneal process.

* * * * *